US010707488B2

(12) United States Patent
Scoggins et al.

(10) Patent No.: US 10,707,488 B2
(45) Date of Patent: Jul. 7, 2020

(54) CARBON ELECTRODE AND LITHIUM ION HYBRID CAPACITOR COMPRISING SAME

(71) Applicant: Entegris, Inc., Billerica, MA (US)

(72) Inventors: Troy Scoggins, Decatur, TX (US); Mackenzie King, Southbury, CT (US); Rex Gerald Sheppard, Decatur, TX (US)

(73) Assignee: ENTEGRIS, INC., Billerica, MA (US)

(*) Notice: Subject to any disclaimer, the term of this patent is extended or adjusted under 35 U.S.C. 154(b) by 0 days.

(21) Appl. No.: 15/620,141

(22) Filed: Jun. 12, 2017

(65) Prior Publication Data

US 2018/0358619 A1    Dec. 13, 2018

(51) Int. Cl.
| | |
|---|---|
| *H01M 4/587* | (2010.01) |
| *H01M 10/0525* | (2010.01) |
| *H01G 11/42* | (2013.01) |
| *H01G 11/34* | (2013.01) |
| *H01G 11/86* | (2013.01) |
| *H01G 11/06* | (2013.01) |
| *C01B 32/20* | (2017.01) |
| *H01G 11/44* | (2013.01) |
| *H01G 11/24* | (2013.01) |

(52) U.S. Cl.
CPC .......... *H01M 4/587* (2013.01); *C01B 32/20* (2017.08); *H01G 11/24* (2013.01); *H01G 11/34* (2013.01); *H01G 11/42* (2013.01); *H01G 11/44* (2013.01); *H01M 10/0525* (2013.01); *C01P 2002/72* (2013.01); *C01P 2004/02* (2013.01); *C01P 2004/61* (2013.01); *C01P 2006/11* (2013.01); *C01P 2006/12* (2013.01); *C01P 2006/40* (2013.01); *H01G 11/06* (2013.01)

(58) Field of Classification Search
None
See application file for complete search history.

(56) References Cited

U.S. PATENT DOCUMENTS

| | | | |
|---|---|---|---|
| 2016/0344030 A1* | 11/2016 | Sakshaug | H01M 4/133 |
| 2017/0155149 A1* | 6/2017 | Kawaguchi | H01M 4/133 |
| 2017/0187041 A1* | 6/2017 | Yamada | H01M 4/587 |

FOREIGN PATENT DOCUMENTS

| | | | |
|---|---|---|---|
| WO | WO2014201275 | * | 12/2014 |
| WO | WO2016006617 | * | 1/2016 |

OTHER PUBLICATIONS

"Proton Induced X-ray Emission (PIXE)," www.elementalanalysis.com, retrieved from Internet URL: https://web.archive.org/web/20160829053408/http://www.elementalanalysis.com:80/services/proton-induced-x-ray-emission-pixe, on Sep. 17, 2017, pp. 1-5.

\* cited by examiner

*Primary Examiner* — Christopher P Domone
(74) *Attorney, Agent, or Firm* — Entegris, Inc.

(57) ABSTRACT

A carbon material is described, having utility for fabricating an electrode of an electrochemical energy device, wherein the carbon material includes a particulate carbon having a particle size $d_{50}$ in a range of from 1 to 15 μm, a bulk density in a range of from 0.3 g/cc to 1.2 g/cc, a surface area as measured by nitrogen BET surface area determination at 25° C. that does not exceed 10 $m^2/g$, and an impurity content of less than 3000 ppm by weight, based on weight of the carbon material. Such carbon material may be utilized in amorphous or graphitic form in an electrode of an electrochemical energy device, such as a negative electrode of a lithium-ion battery or a lithium-ion hybrid capacitor.

20 Claims, 7 Drawing Sheets

US 10,707,488 B2

CARBON ELECTRODE AND LITHIUM ION HYBRID CAPACITOR COMPRISING SAME

FIELD

The present disclosure relates to carbon materials useful in the manufacture of electrodes that are useful in electrochemical energy devices such as lithium-ion batteries and lithium-ion hybrid capacitors, and relates as well to electrodes of such type, and to lithium-ion batteries and lithium-ion hybrid capacitors comprising such electrodes.

DESCRIPTION OF THE RELATED ART

In lithium-ion batteries and lithium-ion hybrid capacitors, the anode is a critical operative component. The anode during charging is electrodeposited with metallic lithium or electrodoped with lithium ions deriving from the electrolytic medium of the device, and during subsequent operation of the device, lithium ions flow from the electrode into the electrolytic medium. In lithium-ion capacitors, the anode is typically pre-doped with lithium ions to reduce anode potential and enable comparatively high output voltage to be achieved.

The anode of such devices may be formed from carbon particles derived by carbonization of an organic precursor, followed by milling or pulverizing the carbonized material to form micrometer-scale carbonized particles, e.g., carbonized particles of diameter in a range of 1-100 μm. These carbonized particles then can be heated to elevated temperature, which may be on the order of 2000° C. or higher, to produce graphite particles suitable for fabrication of the anode, or that can otherwise be processed to provide the anode material.

With respect to the use of carbonaceous materials for lithium-ion hybrid capacitors and lithium-ion batteries, it is established that graphite materials have poor cycling characteristics for lithium-ion battery and lithium-ion hybrid capacitor charging and discharging cycles.

In response to the proliferating use of lithium-ion batteries and lithium-ion hybrid capacitors, the art is engaged in a continuing search for improvements in such devices, and in ongoing efforts to enhance the quality and character of anodes used in such devices. With regard to lithium-ion hybrid capacitors in particular, it would be a particularly significant advance in the art to achieve superior anode performance in lithium-ion hybrid capacitors that show no degradation of anode performance characteristics after 100,000 or more charging/discharging cycles.

SUMMARY

The present disclosure relates to carbon materials useful in the manufacture of electrodes for electrochemical energy devices including lithium-ion batteries and lithium-ion hybrid capacitors, as well as to corresponding electrodes and lithium-ion batteries and lithium-ion hybrid capacitors comprising such electrodes.

In one aspect, the disclosure relates to a carbon material having utility for fabricating a negative anode of an electrochemical energy device, wherein the carbon material comprises a particulate carbon having a particle size $d_{50}$ in a range of from 1 to 15 μm, a bulk density in a range of from 0.3 g/cc to 1.2 g/cc, a surface area as measured by nitrogen BET surface area determination at 25° C. that does not exceed 10 $m^2/g$, and an impurity content of less than 3000 ppm by weight, based on weight of the carbon material.

In another aspect, the disclosure relates to an electrode having utility in an electrochemical energy device, in which the electrode comprises a carbon material of the present disclosure, as variously described herein. In a specific aspect, the electrode after 100,000 charging/discharging cycles retains a capacitance that is within 5% of initial capacitance of the negative electrode prior to initiation of such cycles, and an equivalent series resistance value that is not more than 20% of the initial equivalent series resistance value of the negative electrode prior to initiation of such cycles.

A further aspect of the disclosure relates to an electrochemical energy device comprising a negative electrode of the present disclosure, as variously described herein.

In a still further aspect, the disclosure relates to a method of making a carbon material of the present disclosure, comprising carbonizing a carbonizable precursor material in an inert gas environment to thermally convert the precursor material to the carbon material.

Other aspects, features and embodiments of the disclosure will be more fully apparent from the ensuing description and appended claims.

DETAILED DESCRIPTION

Figure 1:
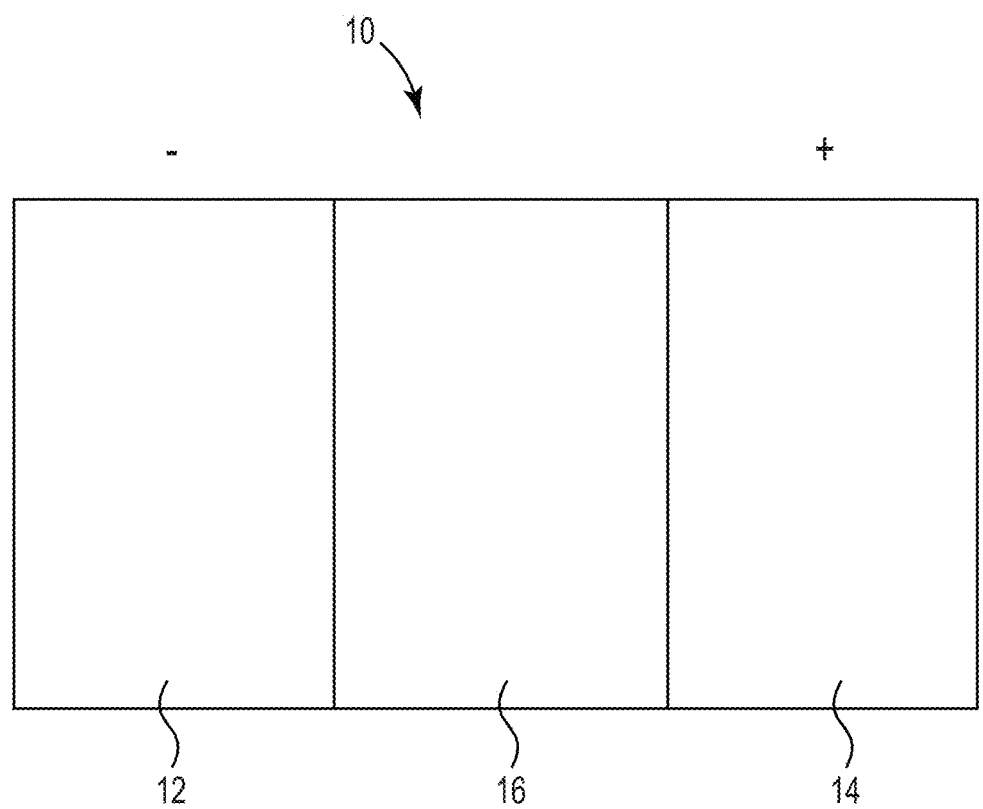
FIG. 1 is a generalized schematic representation of an electrochemical energy device according to the present disclosure.

The present disclosure relates to carbon materials suitable for manufacture of negative electrodes for electrochemical energy devices including lithium-ion batteries and lithium-ion hybrid capacitors, and to electrodes formed from such carbon materials, and corresponding lithium-ion batteries and capacitors comprising such electrodes.

As used herein, unless otherwise indicated, all references to the impurity content of carbon materials of the present disclosure refer to impurity content as determined by the ash test of ASTM C561-91(2010)e1 (Standard Test Method for Ash in a Graphite Sample, ASTM International, West Conshohocken, Pa., 2010, www.astm.org).

The disclosure relates in one aspect to a carbon material having low surface area, high-purity, and high hardness that has surprisingly and unexpectedly been found to provide high storage capacity and superior cycling characteristics as an anode material for lithium-ion hybrid capacitor devices.

The carbon materials of the present disclosure can be in the form of hard carbon material or graphitic carbon powders, with a particle size $d_{50}$ that may be in a range of from 1 to 15 μm in various embodiments. In other embodiments, the particle size $d_{50}$ may be in a range of from 2 to 10 µm, or in a range of from 3 to 8 µm, or in a range of from 4 to 6 µm, or in other suitable range, as may be advantageous in a given implementation of such carbon materials.

The carbon materials of the present disclosure may in particular embodiments have bulk density in a range of from 0.3 g/cc to 1.2 g/cc. Other embodiments of such carbon materials may be characterized by bulk density in a range of from 0.3 g/cc to 0.9 g/cc, or from 0.4 g/cc to 0.8 g/cc, or from 0.5 to 0.7 g/cc, or in other suitable ranges or specific values of bulk density that are appropriate to the specific electrochemical device application in which the carbon material is utilized.

The carbon materials of the disclosure have a surface area that does not exceed 10 m$^2$/g, as measured by nitrogen BET surface area determination at 25° C., and may for example be in a range of from 2.5 to 10 m$^2$/g. The impurity content of carbon materials of the disclosure is less than 3000 ppm by weight, based on weight of the carbon material, as discussed more fully hereinafter.

An illustrative carbon material of the present disclosure has the properties set out below in Table 1.

TABLE 1

| Property | Illustrative value |
| --- | --- |
| Particle size, $d_{50}$ | 5 µm |
| Bulk density | 0.6 g/cc |
| Surface area | ≤10 m$^2$/g |
| Impurity | <3000 ppm wt. |

As discussed above, the impurity content of the carbon material of the present disclosure is less than 3000 ppm by weight, based on total weight of the carbon material. In specific embodiments, the carbon material of the present disclosure contains at least 98% carbon, and impurity content is less than 0.05% for silicon, less than 2% for sulfur, less than 0.05% for calcium, less than 0.8% for vanadium, less than 400 ppm for iron, less than 250 ppm for nickel, less than 20 ppm for copper, and less than 10 ppm for zinc, wherein all percentages and parts per million are by weight, based on total weight of the carbon material, and subject to the limitation that all impurity content (i.e., the total impurity content of the carbon material) is less than 3000 ppm by weight, based on total weight of the carbon material.

In further specific aspects, the carbon materials of the present disclosure, and electrodes formed from such carbon materials, are of a high purity character that may for example be characterized by a total impurity content that in various embodiments is below 1000 ppm by weight, below 500 ppm by weight, below 200 ppm by weight, below 150 ppm by weight, below 100 ppm by weight, below 50 ppm by weight, or below 5 ppm by weight, based on total weight of the carbon material. As an illustrative specific example, the carbon material may contain total impurities in a range of from 0.5 to 5 ppm by weight, based on total weight of the carbon material.

In a particular aspect, the disclosure relates to carbon material of the present disclosure, comprising high purity graphitized material, having total impurity content of less than 150 ppm by weight, based on total weight of the material, e.g., a graphitized carbon material of the present disclosure having total impurity content in the aforementioned range of from 0.5 to 5 ppm by weight, based on total weight of the carbon material.

By way of example, a PIXE (proton-induced X-ray emission) elemental analysis of one illustrative carbon material of the present disclosure is set out in Table 2 below.

PIXE elemental analysis is an X-ray spectrographic technique that is useful for non-destructive, simultaneous elemental analysis of materials. Additional details of such technique are described at http://www.elementalanalysis.com/services/proton-induced-x-ray-emission-pixe (visited Sep. 29, 2015). The PIXE analysis differs from the ash test of ASTM C561-91(2010)e1 in that the ash test removes all oxidizable and volatile elements in a high temperature oxidation process, leaving only heavier metallic elements, whereas the PIXE analysis shows all elements present, which includes sulfur, phosphorus, and other elements that will be vaporized in the ash test of ASTM C561-91(2010)e1. Elemental analysis providing results similar to that of PIXE analysis may be conducted in accordance with the method of ASTM D5381-93 (Reapproved 2014) (X-Ray Fluorescence (XRF) Spectroscopy of Pigments and Extenders), ASTM International, West Conshohocken, Pa., 2010, www.astm.org).

TABLE 2

| Element Name | Energy (keV) | Det. Limit 95% Conf. | Concentration Mass | Error |
| --- | --- | --- | --- | --- |
| *C | — |  | 98.276% |  |
| Na | 1.041 | 101.300 ppm |  |  |
| Mg | 1.254 | 35.430 ppm |  |  |
| Al | 1.487 | 29.650 ppm |  |  |
| Silicon | 1.740 | 18.610 ppm | 0.018% | 0.001% |
| P | 2.014 | 10.580 ppm |  |  |
| Sulphur | 2.308 | 19.480 ppm | 1.58% | 0.02% |
| Cl | 2.623 | 8.743 ppm |  |  |
| K | 3.314 | 6.671 ppm |  |  |
| Calcium | 3.692 | 11.320 ppm | 0.027% | 0.001% |
| Sc | 4.091 | 7.027 ppm |  |  |
| Ti | 4.511 | 5.204 ppm |  |  |
| Vanadium | 4.952 | 8.054 ppm | 0.049% | 0.001% |
| Cr | 5.415 | 6.412 ppm |  |  |
| Mn | 5.899 | 1.045 ppm |  |  |
| Iron | 6.405 | 1.755 ppm | 334 ppm | 4 ppm |
| Co | 6.930 | 1.768 ppm |  |  |
| Nickel | 7.478 | 0.965 ppm | 192 ppm | 2 ppm |
| Copper | 8.048 | 1.133 ppm | 9.5 ppm | 1.0 ppm |
| Zinc | 8.639 | 0.562 ppm | 6.0 ppm | 0.6 ppm |

Generally, carbon materials of the present disclosure may be formed by carbonization of any suitable carbonizable starting materials, including synthetic polymeric materials, petroleum-based materials, petroleum-derived materials, carbohydrates, and combinations, blends, and mixtures of the foregoing. Illustrative synthetic polymeric starting materials include synthetic polymers such as PVDF (polyvinylidene fluoride), PVDC (polyvinylidene chloride), PMA (polymethyl acrylate), and copolymers of these materials. The starting material generally may be of any suitable type, and in specific embodiments the starting material may have a hydrogen-to-carbon molar ratio (H/C) in a range of from 0.5 to 0.7.

Carbonization of the carbonizable starting material may be carried out at any suitable temperature, e.g., a temperature in a range of from 400° C. to 1200° C. or higher, in an inert atmosphere. The carbonized material in various embodiments may be activated, e.g., by chemical and/or physical activation. For example, the carbonized material may be activated by chemical activation by reaction with an acid, e.g., an acid selected from the group consisting of hydrochloric acid, sulfuric acid, phosphoric acid, boric acid, and carbonic acid. In other embodiments, the carbonized material may be chemically activated by reaction with a hydroxide of sodium, lithium, potassium, calcium, or ammonium. In still other embodiments, the carbonized material may be physically activated by burn-off in exposure to $CO_2$, air, or steam in mixture with an inert gas, e.g., nitrogen or argon, or as a pure gas stream at temperature in a range of from 600° C. to 1200° C.

In various embodiments, graphitization of the carbonized material may be carried out at elevated temperatures, e.g., temperature of up to 2000° C., as may be advantageous in a given application of the disclosure, such as where the carbonized material has a total impurity content not exceeding 150 ppm by weight, based on weight of the carbonized material. The extent of the graphitization process and the morphological character of the graphitized product can readily be determined by x-ray diffraction techniques.

The carbon materials of the present disclosure may be used to fabricate anodes for electrochemical energy devices, such as lithium-ion batteries and lithium-ion hybrid capacitors, in which the anode does not suffer any significant diminution of electrical characteristics and performance properties, even after sustained usage, e.g., after 100,000 charge/discharge cycles.

While the disclosure herein is primarily directed to use of the carbon material of the present disclosure in anodes for lithium-ion batteries and lithium-ion hybrid capacitors, it will be recognized that the carbon material of the present disclosure may generally be used for cathodes as well as anodes, as well as in electrodes for a wide variety of energy storage and other electrical devices.

Referring now to the drawings, FIG. 1 is a generalized schematic representation of an electrochemical energy device 10 according to the present disclosure.

The electrochemical energy device may be configured as a lithium-ion hybrid capacitor in which the anode 12 may comprise a lithium-doped carbon electrode formed of a carbon material of the present disclosure, a cathode 14 of activated carbon or other suitable material, and an intermediate electrolyte medium 16, in which the anode 10 undergoes lithium doping during charging and de-doping during discharge operation. The intermediate electrolyte medium may comprise a lithium salt.

The electrochemical energy device 10 in an alternative configuration may comprise the structure shown in FIG. 1, configured as a lithium-ion battery, in which the anode 10 comprises a graphite electrode of the present disclosure, and the cathode may comprise a suitable material such as a lithium cobalt oxide material ($LiCoO_2$), with an intermediate electrolyte.

Figure 2:
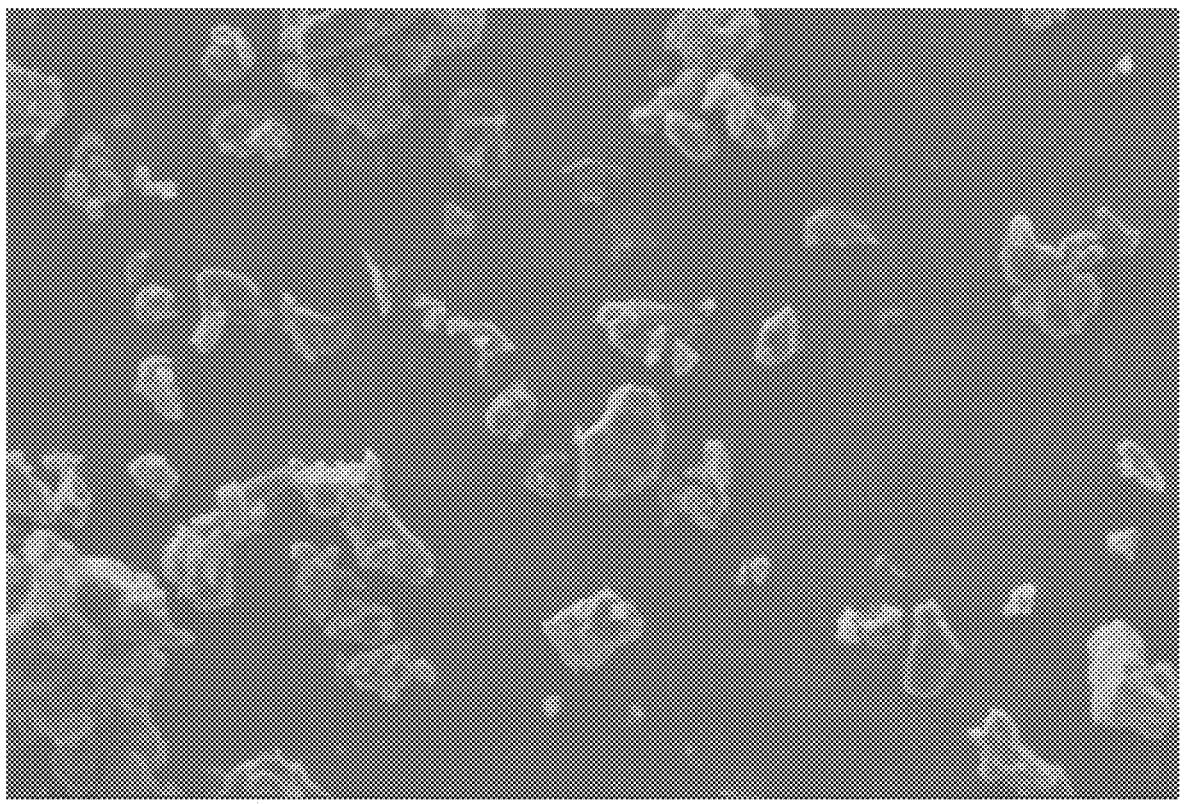
FIG. 2 is a photomicrograph of carbon material of the present disclosure, at magnification of 5000 times.

FIG. 2 is a photomicrograph of a carbon powder material of the present disclosure, at magnification of 5000 times.

Figure 3:
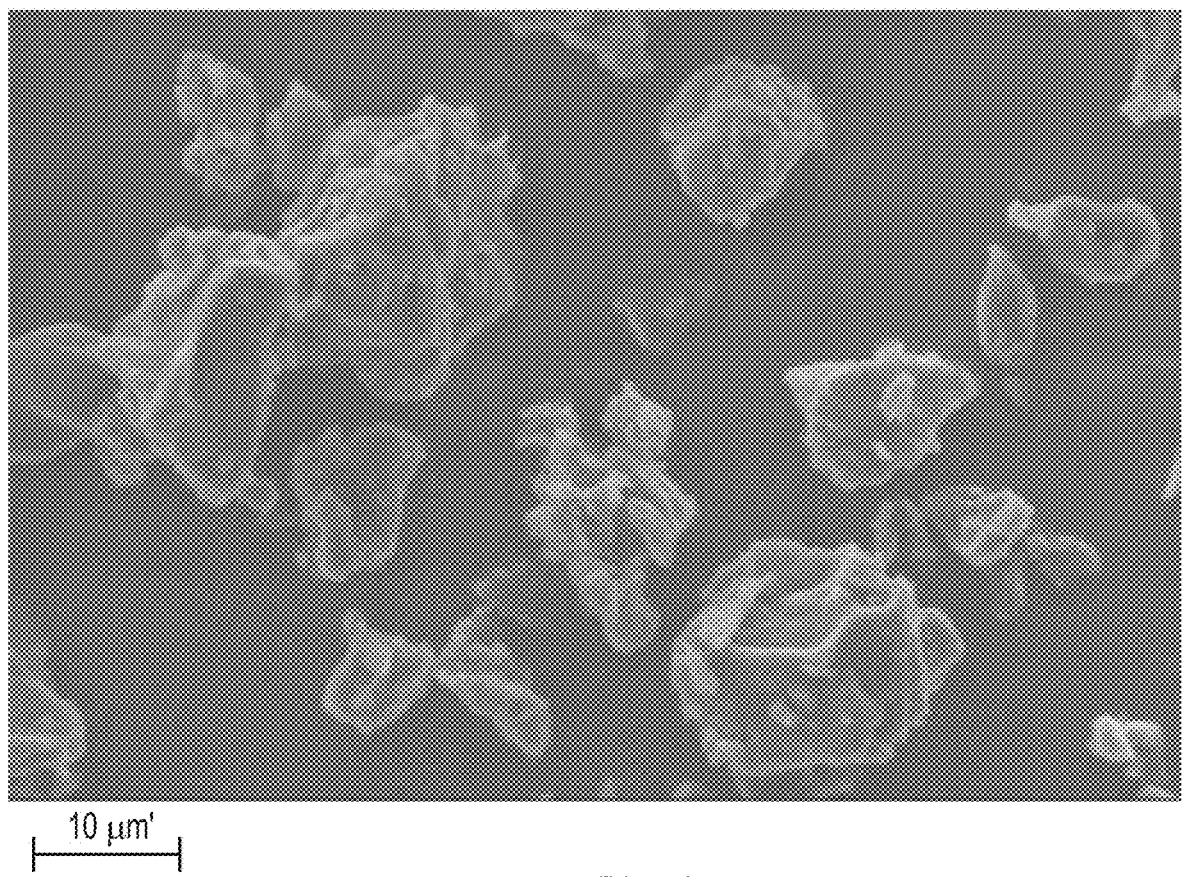
FIG. 3 is a photomicrograph of the carbon material of FIG. 2, at magnification of 10,000 times.

FIG. 3 is a photomicrograph of the carbon material of FIG. 2, at magnification of 10,000 times.

Figure 4:
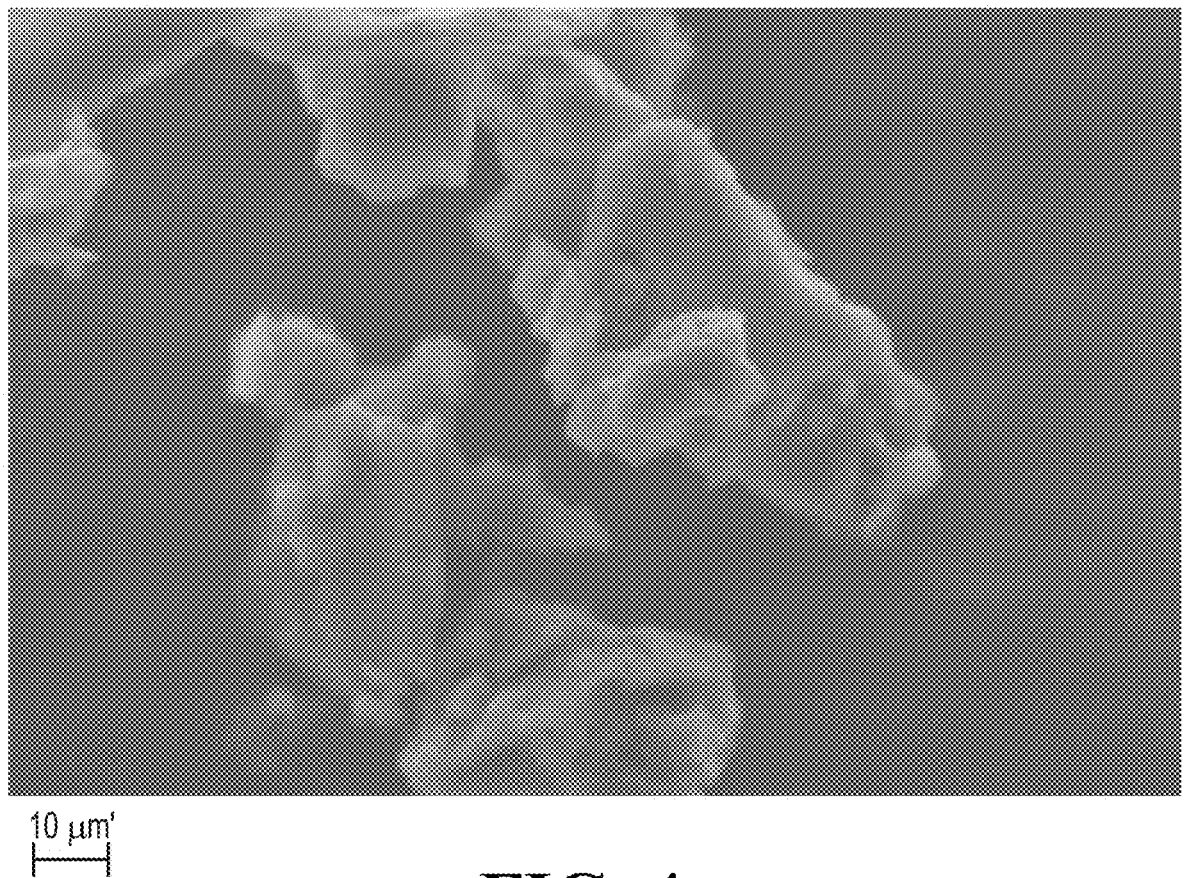
FIG. 4 is a photomicrograph of the carbon material of FIG. 2, at magnification of 25,000 times.

FIG. 4 is a photomicrograph of the carbon material of FIG. 2, at magnification of 25,000 times.

Figure 5:
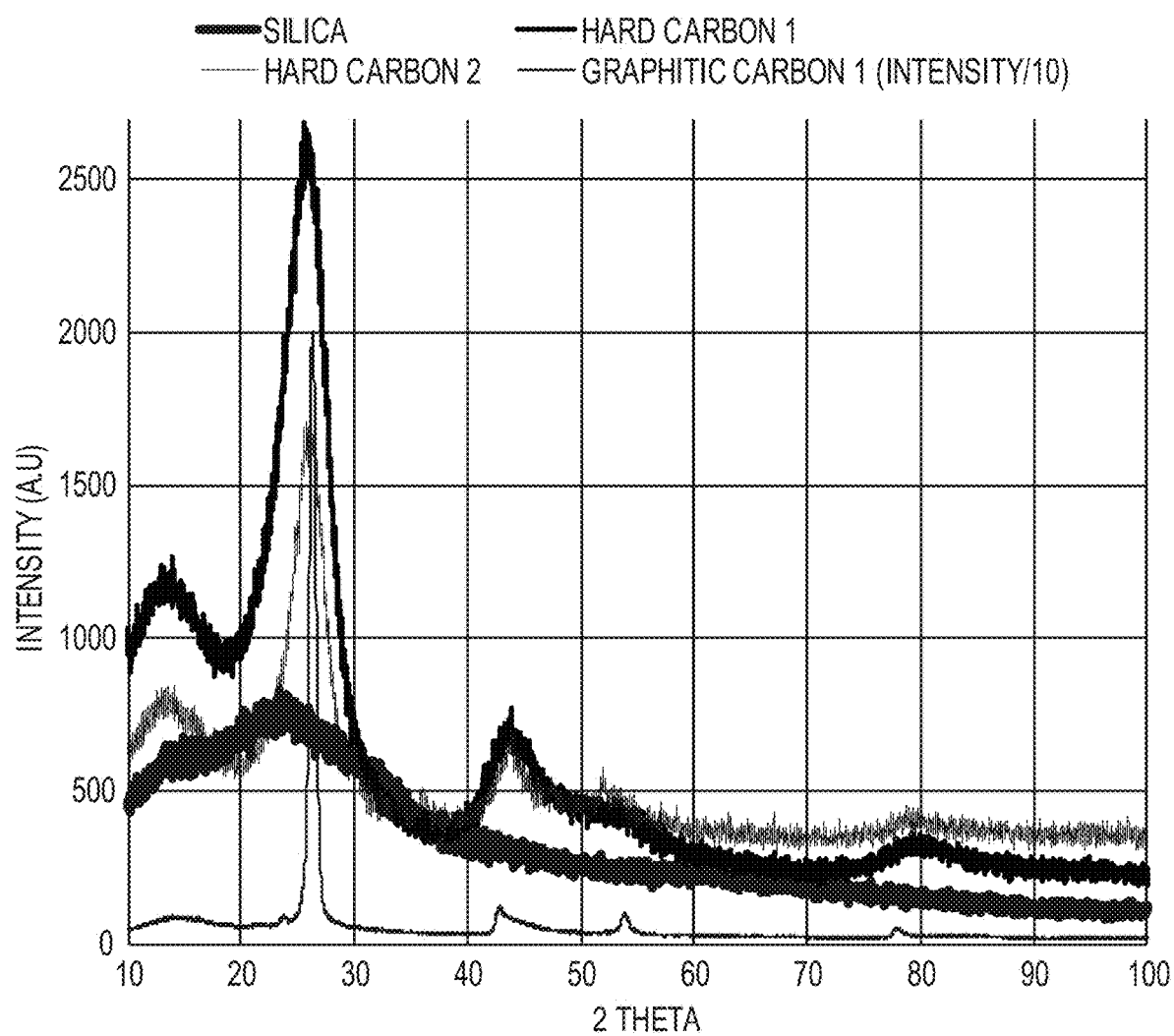
FIG. 5 is a powder x-ray diffraction plot showing the characteristics of hard carbon and graphitic carbon of the present disclosure.

FIG. 5 is a powder x-ray diffraction plot showing the characteristics of hard carbon and graphitic carbon of the present disclosure.

As shown in FIG. 5, principal intensity peaks of the powder x-ray diffraction spectrum centered at a 2 theta angle of about 26° (±0.5°) for the hard carbons and graphitic carbons of the present disclosure.

Figure 6:
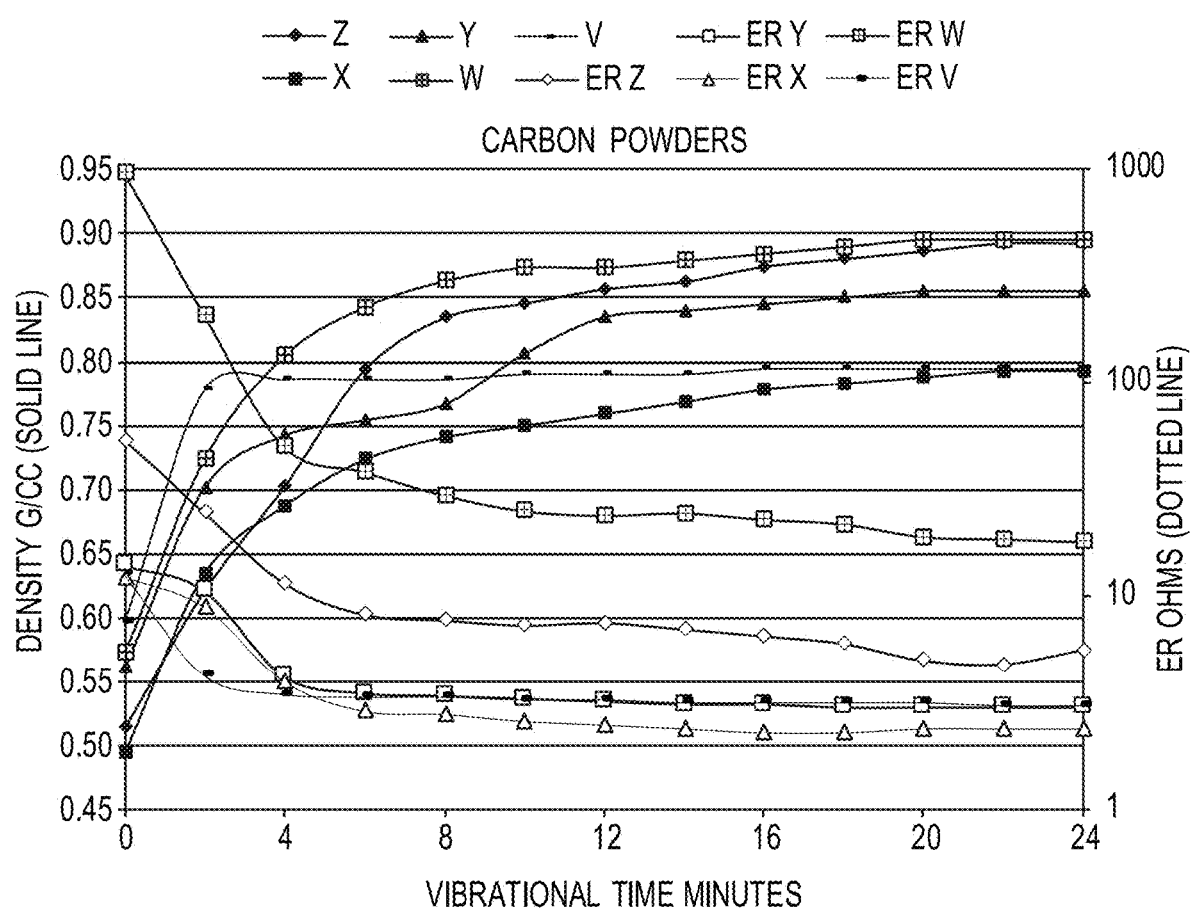
FIG. 6 is a graph of density and electrical resistivity data for various carbon powders of the present disclosure, as characterized after vibrational compaction.

FIG. 6 is a graph of density and electrical resistivity data for various carbon powders of the present disclosure, as characterized after vibrational compaction. In the graph of FIG. 6, density of the powders, in g/cc units, is shown by solid line curves, and electrical resistivity, in ohms, is shown by the dashed line curves, as a function of vibrational time, in minutes. Each of the powders was characterized by placing 250 mL of the non-compacted powder in a graduated cylinder, followed by using a vibrating table apparatus to compact the powder in the graduated cylinder for the indicated number of minutes.

Figure 7:
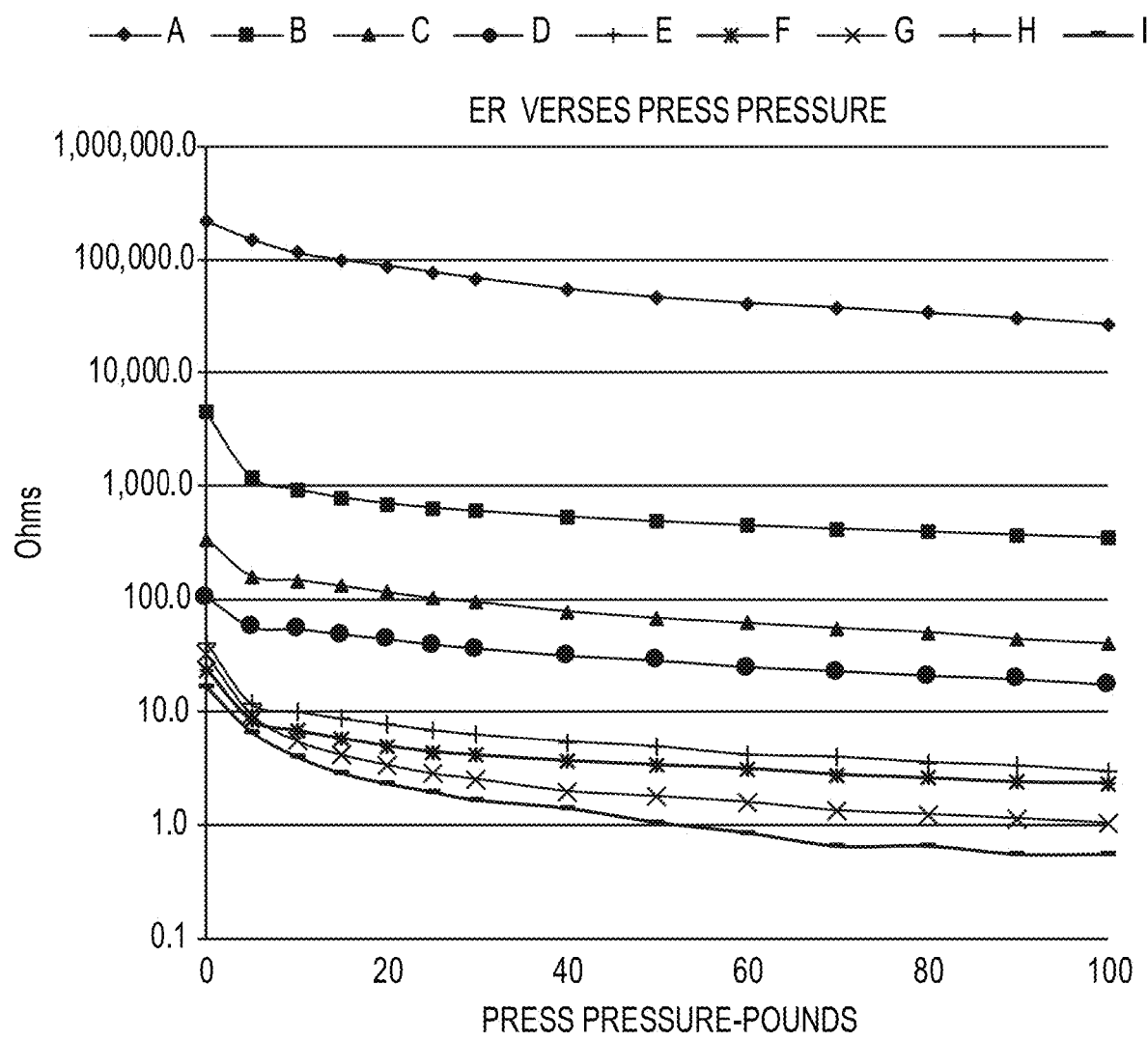
FIG. 7 is a graph of electrical resistivity data, in ohms, as a function of pressure, in pounds, for various carbon powders of the present disclosure.

FIG. 7 is a graph of electrical resistivity data, in ohms, as a function of pressure, in pounds, for various carbon powders of the present disclosure. The electrical resistivity data were collected by placing each powder in a polymer cell having a diameter of 0.8 inch, containing two electrodes spaced apart from one another by a distance of 1 inch, with the powder then being compressed in the cell by application of the indicated amount of pressure. The resistance between the electrodes was then measured while pressure was applied, and electrical resistivity (ER) was calculated based on the distance between the electrodes.

As discussed above, the carbon materials of the present disclosure may be used to fabricate negative electrodes for lithium-ion electrochemical energy devices, in which the anode does not suffer any significant diminution of electrical characteristics and performance properties, even after extended operation involving repetitive charge/discharge cycles.

More specifically, the carbon materials of the present disclosure have been utilized to form anodes that exhibit no significant degradation of anode performance characteristics after 100,000 or more charging/discharging cycles, retaining a capacitance value that is within 5% of the initial capacitance of the electrode, and an equivalent series resistance value that is increased by less than 20%, after 100,000 charging/discharging cycles.

Thus, the disclosure in various aspects contemplates a carbon material having utility for fabricating a negative anode of an electrochemical energy device, in which the carbon material comprises a particulate carbon having a particle size $d_{50}$ in a range of from 1 to 15 µm, a bulk density in a range of from 0.3 g/cc to 1.2 g/cc, a surface area as measured by nitrogen BET surface area determination at 25° C. that does not exceed 10 $m^2$/g, and an impurity content of less than 3000 ppm by weight, based on weight of the carbon material.

Such carbon material in specific embodiments may have a particle size $d_{50}$ that is in a range of from 2 to 10 µm, or a particle size $d_{50}$ in a range of from 3 to 8 µm, or a particle size $d_{50}$ in a range of from 4 to 6 µm. The carbon material may additionally, or independently, have a bulk density that is in a range of from 0.3 g/cc to 0.9 g/cc, or from 0.4 g/cc to 0.8 g/cc, or from 0.5 to 0.7 g/cc, in various embodiments. The surface area of the particulate carbon in various embodiments may be in a range of from 2.5 to 10 $m^2$/g.

The carbon material as variously described above may in specific embodiments contain at least 98% carbon, and have an impurity content that is less than 0.05% for silicon, less than 2% for sulfur, less than 0.05% for calcium, less than 0.8% for vanadium, less than 400 ppm for iron, less than 250 ppm for nickel, less than 20 ppm for copper, and less than 10 ppm for zinc, wherein all percentages and parts per million are by weight, based on total weight of the carbon material, and subject to the limitation that all impurity content is less than 3000 ppm by weight, based on total weight of the carbon material.

The carbon material as variously described herein may be in amorphous or graphitic form. Such carbon material may be derived from any suitable carbonizable starting material.

The disclosure in a further aspect relates to an electrode having utility in an electrochemical energy device, e.g., a negative electrode, comprising a carbon material of the present disclosure, as variously described herein. In various embodiments, such negative electrode after 100,000 charging/discharging cycles retains a capacitance that is within 5% of initial capacitance of the negative electrode prior to initiation of such cycles, and an equivalent series resistance value that is not more than 20% of the initial equivalent series resistance value of the negative electrode prior to initiation of such cycles.

The disclosure in a further aspect relates to an electrode, e.g., a negative electrode, comprising high-purity graphitized carbon material of the present disclosure, having total impurity content of less than 150 ppm by weight, based on total weight of the material, e.g., a graphitized carbon material of the present disclosure having total impurity content in the range of from 0.5 to 5 ppm by weight, based on total weight of the carbon material.

In another aspect, the disclosure relates to an electrochemical energy device comprising a negative electrode of the present disclosure as variously described herein. The negative electrode in such electrochemical energy device may be provided in accordance with the present disclosure to achieve high performance, e.g., so that after 100,000 charging/discharging cycles of device operation, the electrode retains a capacitance that is within 5% of initial capacitance of the negative electrode prior to initiation of such cycles, and an equivalent series resistance value that is not more than 20% of the initial equivalent series resistance value of the negative electrode prior to initiation of such cycles.

The above-described electrochemical energy device may comprise a lithium ion electrochemical energy device, e.g., a lithium ion battery, or a lithium ion hybrid capacitor, incorporating an electrode of the present disclosure and characterized by performance characteristics including an equivalent series resistance of less than 0.2 milliohm, capacitance of greater than 50 Farads/cc, and RC constant of less than 7 seconds.

In another aspect, the disclosure relates to a method of making a carbon material of the present disclosure, comprising carbonizing a carbonizable precursor material in an inert gas environment to thermally convert the precursor material to the carbon material. The carbonizable precursor material may be of any suitable type, including the materials previously illustratively described herein.

In the manufacture of electrodes of the present disclosure, the carbonizable precursor material may be shaped into an electrode preform prior to the carbonizing. The manufacturing method may additionally, or alternatively, be carried out with activation of the carbonized carbon material, e.g., by activation comprising at least one of (i) chemical activation, and (ii) physical activation. The manufacturing method may also, additionally or alternatively, comprise graphitizing the carbonized carbon material, e.g., at temperature of up to 2000° C.

It will be appreciated that the carbon materials, electrodes, and the electrochemical energy devices of the present disclosure may be widely varied in character, to accommodate specific applications and implementations, and that negative electrodes formed of the carbon materials of the present disclosure, when utilized in electrochemical energy devices such as lithium-ion batteries and lithium-ion hybrid capacitors, enable sustained high-efficiency operation of such electrochemical energy devices during extended service, without significant diminution of electrical characteristics and performance properties of the negative electrode components thereof.

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A carbon material having utility for fabricating a negative anode of an electrochemical energy device, said carbon material comprising a particulate carbon having a particle size $d_{50}$ in a range of from 1 to 15 μm, a bulk density in a range of from 0.3 g/cc to 0.9 g/cc, a surface area as measured by nitrogen BET surface area determination at 25° C. that does not exceed 10 $m^2/g$, and a total content of elements present, as determined by PIXE elemental analysis, of less than 3000 ppm by weight, based on weight of the carbon material.

2. The carbon material of claim 1, wherein the particle size $d_{50}$ is in a range of from 2 to 10 μm.

3. The carbon material of claim 1, wherein the bulk density is in a range of from 0.3 g/cc to 0.7 g/cc.

4. The carbon material of claim 1, wherein the surface area of the particulate carbon is in a range of from 2.5 to 10 $m^2/g$.

5. The carbon material of claim 1, wherein the particulate carbon contains at least 98% carbon, less than 0.05% for silicon, less than 2% for sulfur, less than 0.05% for calcium, less than 0.8% for vanadium, less than 400 ppm for iron, less than 250 ppm for nickel, less than 20 ppm for copper, and less than 10 ppm for zinc, wherein all percentages and parts per million are by weight, based on total weight of the carbon material, and subject to the limitation that the total content of elements present, as determined by PIXE elemental analysis, is less than 3000 ppm by weight, based on total weight of the carbon material.

6. The carbon material of claim 1, in an amorphous form.

7. The carbon material of claim 1, in a graphitized form.

8. The carbon material of claim 1, wherein the particulate carbon is a carbonized particulate carbon of a material selected from the group consisting of synthetic polymeric materials, petroleum-based materials, petroleum-derived materials, carbohydrates, and combinations, blends, and mixtures of the foregoing.

9. The carbon material of claim 1, wherein the total content of elements present is below 1000 ppm by weight, based on total weight of the carbon material.

10. The carbon material of claim 1, wherein the total content of elements present is in a range of from 0.5 to 5 ppm by weight, based on total weight of the carbon material.

11. An electrode having utility in an electrochemical energy device, said electrode comprising the carbon material of claim 1.

12. The electrode of claim 11, which after 100,000 charging/discharging cycles retains a capacitance that is within 5% of initial capacitance of the negative electrode prior to initiation of said cycles, and an equivalent series resistance value that is not more than 20% of the initial equivalent series resistance value of the negative electrode prior to initiation of said cycles.

13. An electrochemical energy device comprising the electrode according to claim 11.

14. The electrochemical energy device of claim 13, wherein the electrode after 100,000 charging/discharging cycles retains a capacitance that is within 5% of initial capacitance of the negative electrode prior to initiation of said cycles, and an electrical resistance value that is not more than 20% of the initial equivalent series resistance value of the negative electrode prior to initiation of said cycles.

15. The electrochemical energy device of claim 13, comprising a lithium ion electrochemical energy device.

16. The carbon material of claim 1, wherein the particle size d50 is in a range of from 4 to 6 µm, the bulk density is in a range of from 0.5 g/cc to 0.7 g/cc, and the surface area as measured by nitrogen BET surface area determination at 25° C. is in a range of from 2.5 to 10 $m^2/g$.

17. A method of making a carbon material comprising:
carbonizing a carbonizable precursor material in an inert gas environment to thermally convert the precursor to the carbon material,
wherein said carbon material comprises a particulate carbon having a particle size $d_{50}$ in a range of from 1 to 15 µm, a bulk density in a range of from 0.3 g/cc to 0.9 g/cc, a surface area as measured by nitrogen BET surface area determination at 25° C. that does not exceed 10 $m^2/g$, and a total content of elements present, as determined by PIXE elemental analysis, of less than 3000 ppm by weight, based on weight of the carbon material.

18. The method of claim 17, wherein the carbonizable precursor material has a hydrogen-to-carbon molar ratio (H/C) in a range of from 0.5 to 0.7.

19. The method of claim 17, wherein the carbonizable precursor material is selected from the group consisting of synthetic polymeric materials, petroleum-based materials, petroleum-derived materials, carbohydrates, and combinations, blends, and mixtures thereof.

20. The method of claim 17, wherein the carbonizable precursor material is shaped into an electrode preform prior to said carbonizing.

* * * * *